United States Patent
Bigot-Astruc et al.

(10) Patent No.: US 8,488,931 B2
(45) Date of Patent: Jul. 16, 2013

(54) SINGLE MODE OPTICAL FIBER WITH DEPRESSED TRENCH

(75) Inventors: Marianne Bigot-Astruc, Marcoussis (FR); Pierre Sillard, Le Chesnay (FR); Louis-Anne De Montmorillon, Versailles (FR); Denis Molin, Draveil (FR); Simon Richard, Villebon-sur-Yvette (FR)

(73) Assignee: Draka Comteq B.V. (NL)

( * ) Notice: Subject to any disclaimer, the term of this patent is extended or adjusted under 35 U.S.C. 154(b) by 447 days.

(21) Appl. No.: 12/902,190

(22) Filed: Oct. 12, 2010

(65) Prior Publication Data

US 2011/0085770 A1    Apr. 14, 2011

(30) Foreign Application Priority Data

Oct. 13, 2009   (FR) ..................... 09 04914

(51) Int. Cl.
  *G02B 6/02*   (2006.01)
  *G02B 6/00*   (2006.01)
(52) U.S. Cl.
  USPC ............ 385/127; 385/128; 385/141
(58) Field of Classification Search
  None
  See application file for complete search history.

(56) References Cited

U.S. PATENT DOCUMENTS

| | | | |
|---|---|---|---|
| 6,535,665 B1 * | 3/2003 | Kim et al. | 385/28 |
| 6,751,389 B2 * | 6/2004 | Tirloni | 385/127 |
| 6,961,508 B2 * | 11/2005 | van Eekelen et al. | 385/144 |
| 7,555,186 B2 * | 6/2009 | Flammer et al. | 385/127 |
| 7,889,960 B2 * | 2/2011 | de Montmorillon et al. | 385/127 |
| 7,894,698 B2 * | 2/2011 | Flammer et al. | 385/127 |
| 8,031,997 B2 * | 10/2011 | Overton | 385/110 |
| 8,145,027 B2 * | 3/2012 | Overton et al. | 385/128 |

(Continued)

FOREIGN PATENT DOCUMENTS

| | | |
|---|---|---|
| EP | 0 260 795 A2 | 3/1988 |
| EP | 1 255 138 A1 | 11/2002 |

(Continued)

OTHER PUBLICATIONS

Jan. 12, 2011 Search Report issued in European Patent Application No. 10178306.5.

(Continued)

*Primary Examiner* — Tina Wong
(74) *Attorney, Agent, or Firm* — Shumaker, Loop & Kendrick, LLP

(57) ABSTRACT

An optical fiber having a core and an outer cladding, the core including from its center outward a central core having a radius and a refractive index difference with respect to the outer cladding, and a depressed inner cladding. The depressed inner cladding includes at least a first portion having a radius and a refractive index difference with respect to the outer cladding, the first portion preferably being adjacent to the central core, and a second portion adjacent to the first portion constituting a depressed trench having a radius, and a refractive index difference with respect to the outer cladding. The first portion of the inner cladding has a refractive index below the refractive index of the outer cladding, and the depressed trench has a refractive index that is lower than the refractive index of the first portion of the depressed inner cladding. The outer radius of the depressed inner cladding of the optical fiber is between 28 μm and 40 μm, the LP01 mode leakage losses at a wavelength of 1550 nm are less than 0.01 dB/km and the cable cut-off wavelength is less than 1530 nm.

17 Claims, 1 Drawing Sheet

U.S. PATENT DOCUMENTS

| | | | |
|---|---|---|---|
| 2008/0124028 A1* | 5/2008 | Bickham et al. | 385/55 |
| 2008/0152288 A1* | 6/2008 | Flammer et al. | 385/124 |
| 2009/0279835 A1* | 11/2009 | de Montmorillon et al. | 385/127 |
| 2010/0166373 A1 | 7/2010 | Nakanishi et al. | |
| 2010/0247048 A1 | 9/2010 | Ooizumi et al. | |
| 2010/0290781 A1* | 11/2010 | Overton et al. | 398/43 |

FOREIGN PATENT DOCUMENTS

| | | |
|---|---|---|
| EP | 1 477 831 A1 | 11/2004 |
| EP | 1 978 383 A1 | 10/2008 |
| EP | 2 003 476 A1 | 12/2008 |
| JP | 2004-347884 A | 12/2004 |
| JP | A-2004-347884 | 12/2004 |
| WO | 2008/137150 A1 | 11/2008 |
| WO | 2009/066429 A1 | 5/2009 |
| WO | WO 2009/066429 A1 | 5/2009 |
| WO | 2009/104724 A1 | 8/2009 |
| WO | WO 2009/104724 A1 | 8/2009 |

OTHER PUBLICATIONS

Search Report from French Patent Office dated Mar. 1, 2010 for Patent Application No. FR 09/04914.

* cited by examiner

SINGLE MODE OPTICAL FIBER WITH DEPRESSED TRENCH

TECHNICAL FIELD AND BACKGROUND OF THE INVENTION

The present invention relates to the field of transmission by optical fiber and more specifically to a line fiber for long-distance applications.

An optical fiber conventionally consists of a central core having the function transmitting and possibly amplifying an optical signal, and an outer optical cladding, having the purpose of confining the optical signal within the central core. For this purpose, the refractive indices of the central core $n_c$ and the outer optical cladding $n_g$ are such that $n_c > n_g$.

For optical fibers, the index profile is generally qualified as a function of the shape of a graph showing the relation between fiber radius and refractive index. Conventionally, the x-axis gives the distance r from the centre of the fiber while the y-axis shows the difference between the refractive index and the refractive index of the fiber cladding. Thus speaking of a "step", "trapezium" or "triangle" index profile for graphs which show respective step, trapezium or triangular shapes. Such curves are generally representative of the theoretical or set profile for the fiber, whereas the fiber production constraints may lead to a slightly different profile.

There are two main types of optical fibers: multimode and single mode optical fibers. In a multimode fiber, for a given wavelength, several optical modes propagate simultaneously along the fiber. In a single mode optical fiber, the signal propagates in a fundamental mode LP01 guided within the fiber core while higher order modes such as mode LP11 are heavily attenuated. As line fibers for optical fiber transmission systems, step index single mode fibers (SMF) are conventionally employed.

The fiber is typically produced from silica, either natural or synthetic. To obtain the relative index difference between the core and cladding, the core index can be raised by doping it with a suitable substance, such as germanium, the cladding remaining in silica. One alternative consists in preserving a core in silica and decreasing the cladding index by doping it with a suitable substance such as for example fluorine. The result is a so-called Pure Silica Core Fiber (PSCF)—i.e. a fiber having a core that is of undoped silica.

Which of the two processes is chosen can depend on the envisaged use of the fiber. For instance, in a radioactive environment, germanium will combine with hydrogen present in the atmosphere and lead to significant fiber defects thereby increasing transmission losses. A pure silica core fiber with a doped cladding is consequently preferred for use in a radioactive environment. Which process is chosen for obtaining a refractive index profile also depends on the performance required of the fiber. In the particular case of long-distance transmission applications necessitating very low levels of attenuation, pure silica core optical fibers are preferred having an attenuation less than 0.180 dB/km@1550 nm. In effect, the dopant present in the doped core of a fiber contributes to the Rayleigh diffraction (~0.02 dB/km@1550 nm).

Nevertheless, it is difficult to obtain fibers having a doped cladding. The cost of producing a fiber with a doped cladding is higher than that for a fiber having a cladding in pure silica. Consequently, efforts are made to minimize the radius of the doped cladding in a pure silica core fiber. One solution consists in depositing a doped cladding, called the inner cladding, around a pure silica core, and using standard silica for a part of the cladding called the outer optical cladding. Nevertheless, this method is limited as the outer optical cladding, which has a refractive index close to that of the core, needs to be placed sufficiently far away from the latter. In effect, the proximity of the silica cladding brings about an increase in fundamental propagation mode LP01 leakage losses.

It is known to improve the optical parameters of a fiber using a depressed trench included in the inner cladding between the central core and the outer optical cladding. However, the fact of adding a depressed trench introduces the propagation of additional modes, LP11 principally, which leads to an increase in the cable cut-off wavelength of the fiber. A high cable cut-off wavelength (beyond 1550 nm) limits the single mode character of the fiber with respect to wavelengths of the optical signal.

U.S. Pat. No. 4,852,968 discloses in FIG. 4 a fiber having a core, a first inner cladding, a depressed trench, a second inner cladding and an outer cladding. This document sets out to improve certain optical parameters of the fiber through the presence of a depressed trench and notably, parameters for dispersion, confinement and bending losses of the fundamental mode. But this document does not give details of the characteristics of the depressed inner cladding and of the depressed trench making it possible to obtain low leakage losses for the fundamental mode and a low cut-off wavelength. Additionally, the relative core radii concerning FIG. 4 are relatively small (between 2.5 µm and 3.5 µm). The characteristics of the fiber do consequently not allow it to provide minimized doped cladding radius while preserving low fundamental mode leakage losses and a low cable cut-off wavelength (less than 1550 nm).

U.S. Pat. No. 5,044,724 discloses in FIG. 4 the possibility of employing the profiles discussed in the above document (U.S. Pat. No. 4,852,968) for obtaining structures that are even more depressed with cores having indices close to that of silica. This document does not give details of the characteristics of the depressed inner cladding and of the depressed trench making it possible to obtain a minimized doped cladding radius while preserving low fundamental mode leakage losses and low cut-off wavelengths.

US-A-2005/0089289 discloses, in FIGS. 6 and 8, a silica core fiber having an inner cladding, a depressed trench constituting the periphery of the inner depressed cladding, and an outer cladding. If the cable cut-off wavelength is specified to be below 1330 nm, this document does not give details of the characteristics of the depressed inner cladding and of the depressed trench making it possible to obtain low fundamental mode leakage losses. Additionally, the ratio between the radii of the core and the depressed inner cladding is very small (between 1.25 and 3.34) for this configurations in which the trench is at the periphery of the inner cladding. Similarly, the index difference of the trench compared to that of the outer cladding is fairly high (greater than $-7.3 \times 10^{-3}$). The characteristics of this fiber do not consequently allow it to provide a minimized doped cladding radius while preserving low fundamental mode leakage losses.

US-A-2008/0279517 discloses a fiber having a core, an inner cladding, a depressed trench constituting the periphery of the depressed inner cladding, and an outer cladding. If the cable cut-off wavelength is less than 1530 nm, no silica core type depressed structure is mentioned and nor, as a consequence, is the impact of a depressed inner cladding and a depressed trench on fundamental mode leakage losses. Further, the radius of the trench located at the periphery of the inner cladding is fairly small (<28 μm), which does not make it possible to obtain low fundamental mode leakage losses.

None of the prior art documents identified seems to disclose a refractive index profile for an optical fiber having a reduced doped cladding radius, exhibiting low fundamental mode leakage losses and a low cut-off wavelength making it possible to maintain single mode character around 1550 nm.

There is consequently a need for an optical fiber having a doped cladding the radius of which is minimized without at the same time increasing fundamental mode LP01 leakage losses, and while preserving a low cut-off wavelength.

BRIEF SUMMARY OF THE INVENTION

To this end, it is proposed to reduce the doped cladding radius by adding a depressed trench in the inner cladding. The depressed trench has characteristics making it possible to limit leakage losses in LP01 propagation mode which are drastically increased when an outer optical cladding having a refractive index close to that of silica is brought close to the central core. The trench structure and position are chosen so as to obtain the best compromise.

The invention provides more particularly an optical fiber according to claim 1.

In essence the aim of the present invention is to add a depressed trench is refractive index profiles having a low refractive index of the central core—and consequently having leakage losses) in order to be able to move the outer optical cladding closer to the central core—in order to reduce manufacturing costs and for reasons of compatibility with large volumes of manufacturing—but while keeping a low cable cut-off wavelength.

In one embodiment, the outer radius of the depressed inner cladding is less than 36 μm.

In another embodiment, the total attenuation at a wavelength of 1550 nm is less than 0.19 dB/km, preferably less than 0.18 dB/km.

In yet another embodiment, the area of the second portion defined by $(\Delta n_2 - \Delta n_3)*(r_3^2 - r_2^2)$, is comprised between 0.8 and 3.6 μm².

In yet another embodiment, the ratio $r_2/r_1$ is greater than 6.

In yet another embodiment, wherein the depressed inner cladding furthermore comprises a third portion located between the second portion and the outer optical cladding, said third portion having a radius $r_4$ and a refractive index difference $\Delta n_4$ with the outer optical cladding, wherein the refractive index difference $\Delta n_4$ is greater than, or stated otherwise, less negative than, the refractive index difference $\Delta n_3$ of the second portion with respect to the outer optical cladding.

In yet another embodiment, the ratio $r_2/r_1$ is comprised between 1.5 and 3.5.

In yet another embodiment, the radius $r_1$ of the central core is comprised between 3.8 and 7 μm.

In yet another embodiment, the refractive index difference $\Delta n_1 - \Delta n_2$ between the central core and the first portion of the depressed inner cladding is comprised between $3.9 \times 10^{-3}$ and $6.2 \times 10^{-3}$.

In yet another embodiment, the refractive index difference $\Delta n_3$ between the second portion and the outer optical cladding is comprised between $-16 \times 10^{-3}$ and $-7 \times 10^{-3}$.

In yet another embodiment, the refractive index difference $\Delta n_3$ between the first portion of the depressed inner cladding and the outer optical cladding is comprised between $-7 \times 10^{-3}$ and $-2 \times 10^{-3}$.

In yet another embodiment, the depressed inner cladding comprises at least one additional portion located between the central core and the first portion of the depressed inner cladding, said at least one additional portion having a refractive index difference with the outer optical cladding that lies between $\Delta_1$ and $\Delta n_3$.

In yet another embodiment, the first portion of the depressed inner cladding is adjacent the central core, i.e. the central core is directly surrounded by the first portion of the depressed inner cladding.

In yet another embodiment, the mode field diameter (MFD) at a wavelength of 1550 nm is comprised between 9.5 μm and 14 μm.

In yet another embodiment, the chromatic dispersion at a wavelength of 1550 nm is comprised between 14 and 24 ps/nm·km.

In yet another embodiment, the chromatic dispersion at a wavelength of 1550 nm is less than 22 ps/nm·km.

In yet another embodiment, the chromatic dispersion at a wavelength of 1550 nm is less than 20 ps/nm·km.

In yet another embodiment, the slope of the chromatic dispersion at a wavelength of 1550 nm is comprised between 0 ps/nm²·km and 0.070 ps/nm²·km.

In yet another embodiment, the central core is made of pure silica.

In yet another embodiment, the central core is made of germanium doped silica with a concentration of germanium less than 3 wt %.

An optical transmission system comprising at least a portion of optical fiber as described above is also provided by the present invention.

BRIEF DESCRIPTION OF THE DRAWINGS

Further characteristics and advantages of the invention will become more clear from reading the following description of some embodiments of the invention provided by way of example and with reference to the attached drawings, which show.

DETAILED DESCRIPTION OF THE INVENTION

The optical fiber according to the present invention has an outer optical cladding which surrounds an optical core. The optical core comprises, from the center to the peripheriy, i.e. from the inside to the outside, i) a central core having a radius and a refractive index difference with respect to the outer optical cladding, and ii) a depressed inner cladding. The depressed inner cladding includes at least a) a first portion having a radius and a refractive index difference with respect to the outer optical cladding, this first portion preferably being adjacent to the central core; and b) a second portion adjacent to the first portion; said second portion constituting a depressed trench, said second portion having a radius and a refractive index difference with respect to the outer optical cladding. The first portion of the depressed inner cladding has a refractive index that is less than the refractive index of the outer optical cladding (i.e. that is negative with respect to the outer optical cladding), and the second portion of the depressed inner cladding has a refractive index that is less (i.e. more negative) than the refractive index of the first portion of the depressed inner cladding. The fiber of the present invention has an outer radius of the depressed inner cladding that is between 28 μm and 40 μm. The fiber further has LP01 mode leakage losses at a wavelength of 1550 nm of less than 0.01 dB/km, and a cable cut-off wavelength is less than 1530 nm. Thus, the fiber of the invention has a depressed inner cladding radius which is minimized, while still preserving low leakage losses in LP01 fundamental mode, and a low cable cut-off wavelength. This combination of features is obtained by the specific structure of the depressed inner cladding as specified in claim 1.

Figure 1:
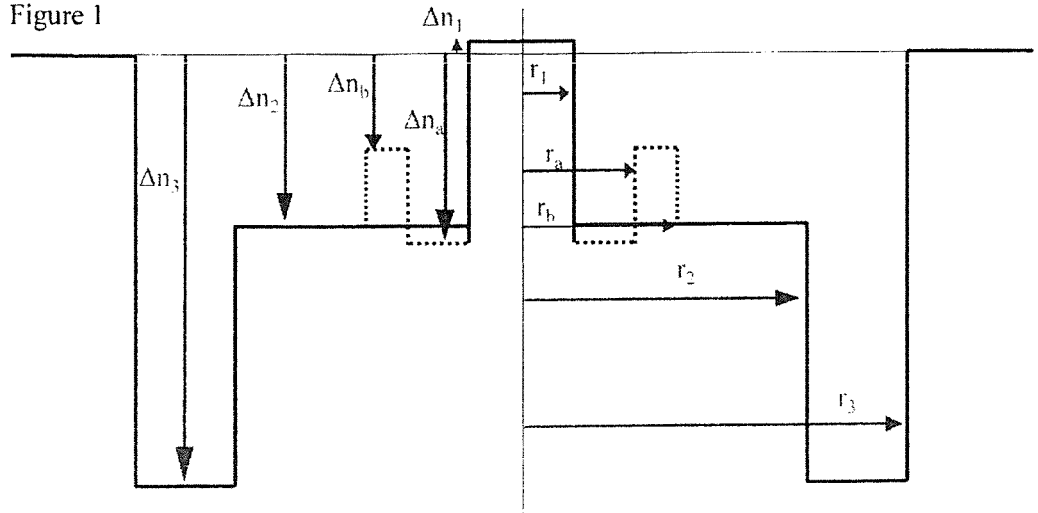
FIG. 1 a refractive index profile of an optical fiber according to a first embodiment of the present invention.
Figure 2:
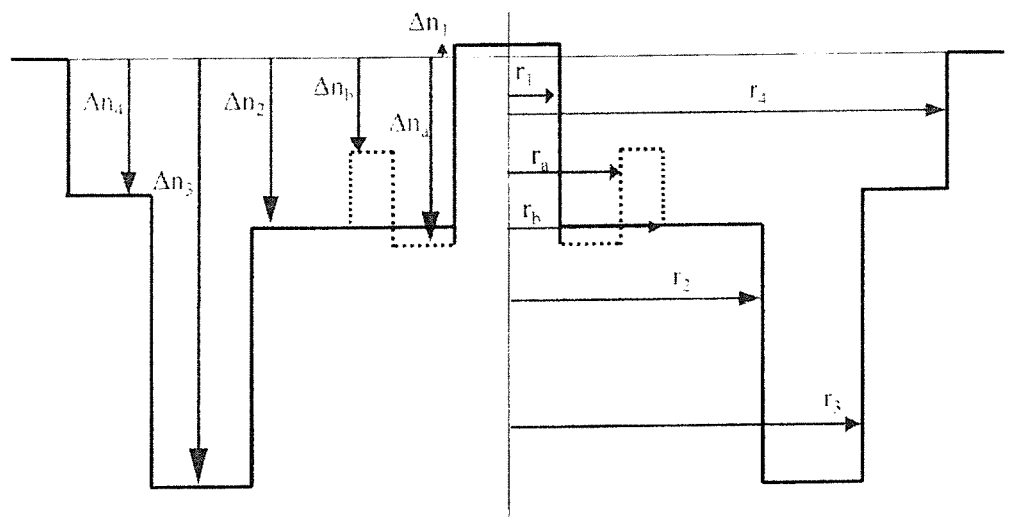
FIG. 2 a refractive index profile of an optical fiber according to a second embodiment of the present invention.

Two examples of refractive index profiles for optical fibers according to the present invention are shown in FIGS. 1 and 2.

In these figures, the central core has a radius $r_1$, and a refractive index difference $\Delta n_1$ with the outer optical cladding. The radius $r_1$ of the central core can be comprised between 3.8 μm and 7 μm. The central core of the fiber according to the present invention can be made of silica, either natural or synthetic. In particular, the central core of the fiber according to the present invention can be made of pure silica, in other words without the presence of dopants. Nevertheless, the central core of the optical fiber according to the present invention can be slightly doped with germanium in a weight concentration less than 3 wt %, preferably comprised between 1 and 3 wt % in order to increase the refractive index of the central core, the characteristics of the fiber remaining substantially unchanged. The central core doped with germanium may be co-doped with fluorine in a weight concentration less than 1 wt %. The fluorine is employed to decrease the refractive index of the central core and adjust it to a desired value, a decrease in refractive index of $1 \times 10^{-3}$ corresponding to a concentration by weight in fluorine of approximately 0.3 wt %.

The depressed inner cladding is depressed, in other words has a refractive index that is lower than that of, i.e. negative with respect to, the outer optical cladding. The decrease in the refractive index of the depressed inner cladding to below the refractive index of the outer optical cladding can be obtained by doping the depressed inner cladding with fluorine or any other suitable chemical compound.

This depressed inner cladding comprises a first portion having a radius $r_2$ and a refractive index difference $\Delta n_2$ with respect to the outer optical cladding. This first portion of the depressed inner cladding is adjacent to, i.e. directly surrounded by, the second portion of the depressed inner cladding, or the trench, as discussed above. Preferably, the refractive index difference $\Delta n_2$ of the first portion of the depressed inner cladding is such that $\Delta n_1 - \Delta n_2$ is comprised between $3.9 \times 10^{-3}$ and $6.2 \times 10^{-3}$. The values for the refractive index difference $\Delta n_1 - \Delta n_2$ and radius $r_1$ of the central core preferably ensure that the mode field diameter (or MFD) $2W_{02}$ of the fiber at a wavelength of 1550 nm is comprised between 9.5 m and 14 μm, the chromatic dispersion is comprised between 14 ps/nm·km and 24 ps/nm·km at a wavelength of 1550 nm, and the chromatic dispersion slope is comprised between 0 ps/nm²·km and 0.070 ps/nm²·km at a wavelength of 1550 nm, the chromatic dispersion at a wavelength of 1550 nm being able to be less than 22 ps/nm·km, even less than 20 ps/nm·km. Preferably, the refractive index difference $\Delta n_3$ between the first portion of the depressed inner cladding and the outer optical cladding can be comprised between $-7 \times 10^{-3}$ and $-2 \times 10^{-3}$.

The depressed inner cladding also comprises a second portion (also called the depressed trench) having a radius $r_3$, and a refractive index difference $\Delta n_3$ with the outer optical cladding. The depressed trench is a second portion of the depressed inner cladding, and is adjacent to the first portion. The second portion of the depressed inner cladding has a refractive index that is less than the refractive index of the first portion of radius $r_2$. In other words, the second portion has a refractive index that is more negative that the refractive index of the first portion of the depressed inner cladding. The refractive index difference $\Delta n_3$ of the second portion of the depressed inner cladding is preferably comprised between $-16 \times 10^{-3}$ and $-7 \times 10^{-3}$, and the area of the second portion of the depressed inner cladding, defined by $(\Delta n_2 - \Delta n_3) \times (r_3^2 - r_2^2)$, is preferably comprised between 0.80 μm² and 3.6 μm². These values make it possible to bring the outer optical cladding closer to the central core, in other words decrease the radius of the depressed inner cladding, without substantially deteriorating the fiber parameters, such as the fundamental mode LP01 leakage losses and the cable cut-off wavelength. The area of the second portion of the depressed inner cladding should be large enough to limit LP01 mode leakage losses, but should not be too large in order to conserve the LP11 mode leakage thereby guaranteeing a cable cut-off wavelength less than 1530 nm.

It should be noted that the first portion of the depressed inner cladding can also include at least one—i.e. one to several—supplementary or additional portion having a refractive index difference that is comprised between $\Delta n_1$ and $\Delta n_3$, such as for example, in FIGS. 1 and 2, the portions of index $\Delta n_a$ and $\Delta n_b$ and of radius $r_a$ and $r_b$. this additional portion is located between the central core and the first portion of the depressed inner cladding. In another embodiment the first portion of the depressed inner cladding directly surrounds, i.e. is adjacent to, the central core.

Thus, in the fiber, the outer radius of the depressed inner cladding is less than 40 μm. The radius of the depressed inner cladding can be less than 38 μm, and can even be less than 36 μm. This radius corresponds to the outer radius of the depressed inner cladding, in other words including at least the first portion and the second portion. The depressed inner cladding has a minimized radius, while still maintaining the LP01 mode leakage losses below the value of 0.01 dB/km. The LP11 mode leakage losses nevertheless remain sufficiently high to obtain a cable cut-off wavelength $\lambda_{cc}$ less than 1530 nm. The outer radius of the depressed inner cladding is at least 28 μm, in order to preserve the values for leakage losses in the LP01 mode.

The fiber according to the present invention has values for leakage losses in the LP01 mode which make it possible to achieve an overall attenuation at 1550 nm wavelength that is less than 0.19 dB/km, preferably less than 0.18 dB/km.

According to the first embodiment of the present invention illustrated in FIG. 1, the second portion of the depressed inner cladding constitutes the outer periphery of the depressed inner cladding. In other words, the second portion is directly surrounded by the outer optical cladding. In FIG. 1, the outer radius of the depressed inner cladding comprised between 28 and 40 μm, or even between 28 and 38 μm, or yet even between 28 and 36 μm, consequently corresponds to the radius $r_3$ of the second portion of the depressed inner cladding. In this embodiment, the radius $r_2$ of the first portion of the depressed inner cladding is such that the ratio $r_2/r_1$ is greater than 6. This value ensures that the cable cut-off wavelength $\lambda_{cc}$ is less than 1530 nm without this bringing about an increase in fundamental mode leakage losses.

In the second embodiment of the present invention illustrated in FIG. 2, the second portion of the depressed inner cladding does not constitute the outer periphery of the depressed inner cladding. This depressed inner cladding further comprises a third portion that is supplementary or additional and that is located between the second portion of the depressed inner cladding and the outer optical cladding. In this embodiment, this third portion constitutes the outer periphery of the depressed inner cladding. This third portion of the depressed inner cladding has a radius $r_4$ and a refractive index difference $\Delta n_4$ with the outer optical cladding that is greater than the refractive index difference $\Delta n_3$ of the second portion of the depressed inner cladding. The refractive index of the third portion is greater (i.e. less negative) than that of the second portion of the depressed inner cladding. In FIG. 2, the outer radius of the depressed inner cladding comprised between 28 and 40 μm, or yet even between 28 and 38 μm or even between 28 and 36 μm, consequently corresponds to the radius $r_4$ of this third portion. In this embodiment, the first portion of the depressed inner cladding has a radius $r_2$ whereby the ratio $r_2/r_1$ is comprised between 1.5 and 3.5. This range of values ensures that the cable cut-off wavelength $\lambda_{cc}$ is less than 1530 nm without this bringing about an increase in fundamental mode leakage losses. The presence of a third depressed inner cladding portion allows for greater flexibility in fiber design, and makes it possible to bring the second portion of the depressed inner cladding closer to the central core.

In an example of a fiber according to the present invention, the fiber is constituted by the central core and the depressed inner cladding directly in contact with the central core, the depressed inner cladding being constituted by the first portion adjacent to the central core and by the second portion adjacent to the first portion.

In another example of a fiber according to the invention, the fiber is constituted by the central core, and by the depressed inner cladding directly in contact with the central core, the depressed inner cladding being constituted by the first portion adjacent to the central core, by the second portion adjacent to the first portion and by the third portion adjacent to the second portion.

The advantages of the invention and the significance of the ranges of values given above will be better understood with the aid of the examples of fiber described in tables I and II.

Table I shows values for radii and refractive index differences with respect to the outer optical cladding for the refractive index profiles for several examples of optical fibers. The Examples PSCF1, PSCF2 and PSCF3 are fibers with a pure silica central core according to the prior art of which the depressed inner cladding does not include a depressed trench. The Examples DT5, DT6 and DT7 are fibers with a central core of silica, with the depressed inner cladding comprising a depressed trench (DT) which does not comply with the characteristics of the invention. Examples DT1-4, DT8-16 are fibers according to the invention.

TABLE I

| profiles | $r_1$ (μm) | $r_a$ (μm) | $r_b$ (μm) | $r_2$ (μm) | $r_3$ (μm) | $r_4$ (μm) | $r_2/r_1$ | $\Delta n_1$ (·10⁻³) @633 nm | $\Delta n_a$ (·10⁻³) @633 nm | $\Delta n_b$ (·10⁻³) @633 nm | $\Delta n_2$ (·10⁻³) @633 nm | $\Delta n_3$ (·10⁻³) @633 nm | $\Delta n_4$ (·10⁻³) @633 nm |
|---|---|---|---|---|---|---|---|---|---|---|---|---|---|
| PSCF1 | 4.53 | | | 40.72 | | | 9.0 | 0.0 | | | −5.0 | | |
| DT1 | 4.53 | | | 28.06 | 33.94 | | 6.2 | 0.0 | | | −5.0 | −13.0 | |
| DT2 | 4.53 | | | 28.06 | 33.94 | | 6.2 | 0.0 | | | −5.0 | −14.0 | |
| DT3 | 4.53 | | | 14.06 | 19.94 | 33.94 | 3.1 | 0.0 | | | −5.0 | −13.0 | −5.0 |
| DT4 | 4.53 | | | 9.53 | 17.67 | 31.68 | 2.1 | 0.0 | | | −5.0 | −13.0 | −5.0 |
| DT5 | 4.53 | | | 28.06 | 33.94 | | 6.2 | 0.0 | | | −5.0 | −15.0 | |
| DT6 | 4.53 | | | 25.00 | 33.94 | | 5.5 | 0.0 | | | −5.0 | −13.0 | |
| DT7 | 4.53 | | | 23.53 | 31.68 | | 5.2 | 0.0 | | | −5.0 | −13.0 | |
| PSCF2 | 3.98 | | | 39.80 | | | 10.0 | 0.0 | | | −5.8 | | |
| DT8 | 3.98 | | | 27.33 | 33.83 | | 6.9 | 0.0 | | | −5.8 | −12.0 | |
| DT9 | 3.98 | | | 25.34 | 31.84 | | 6.4 | 0.0 | | | −5.8 | −14.0 | |
| DT10 | 3.98 | | | 9.23 | 18.00 | 29.85 | 2.3 | 0.0 | | | −5.8 | −14.0 | −5.8 |
| PSCF3 | 4.89 | | | 44.50 | | | 9.1 | 0.0 | | | −4.3 | | |
| DT11 | 4.89 | | | 30.34 | 35.94 | | 6.2 | 0.0 | | | −4.3 | −13.0 | |
| DT12 | 4.53 | | | 14.06 | 19.94 | 32.94 | 3.1 | 2.5 | | | −2.5 | −10.5 | −2.5 |
| DT13 | 3.98 | | | 9.23 | 18.00 | 28.80 | 2.3 | 2.9 | | | −2.9 | −11.1 | −2.9 |
| DT14 | 6.01 | | | 11.2 | 14.4 | 36 | 1.9 | 0 | | | −4.0 | −16.0 | −4.0 |
| DT15 | 3.85 | | | 10.6 | 16.4 | 34.0 | 2.75 | 0 | | | −5.8 | −11.8 | −5.8 |
| DT16 | 4.73 | 7.9 | 9.79 | 30.4 | 36 | | 6.4 | 0 | −5.4 | −2.7 | −5.4 | −7.7 | |

Table II below gives the optical characteristics for fibers corresponding to the refractive index profiles of Table I. In Table II, the first column corresponds to the references from Table I. The columns that follow give, for each fiber profile, the values of cable cut-off wavelength $\lambda_{cc}$, leakage losses at a wavelength of 1550 nm, chromatic dispersion D at the wavelength of 1550 nm, slope P for chromatic dispersion at the wavelength of 1550 nm, and mode field diameter $2W_{02}$ at the wavelength of 1550 nm. The last column gives the value for the area of the corresponding depressed trench (second portion of the depressed inner cladding for fibers according to the present invention).

TABLE II

| profiles | $\lambda_{cc}$ (nm) | Leakage losses @1550 nm (dB/km) | D @1550 nm (ps/nm·km) | P @1550 nm (ps/nm²·km) | $2W_{02}$ @1550 nm (µm) | $(\Delta n_2 - \Delta n_3) \times (r_3^2 - r_2^2)$ |
|---|---|---|---|---|---|---|
| PSCF1 | 1205 | 0.004 | 17.8 | 0.055 | 10.6 | |
| DT1 | 1493 | 0.004 | 17.8 | 0.055 | 10.6 | 2.9 |
| DT2 | 1522 | 0.003 | 17.8 | 0.055 | 10.6 | 3.3 |
| DT3 | 1489 | 0.004 | 18.2 | 0.058 | 10.5 | 1.6 |
| DT4 | 1491 | 0.004 | 20.3 | 0.062 | 10.2 | 1.8 |
| DT5 | >1550 | 0.002 | 17.8 | 0.055 | 10.6 | 3.6 |
| DT6 | >1550 | <0.001 | 17.8 | 0.055 | 10.6 | 4.2 |
| DT7 | >1550 | 0.003 | 17.8 | 0.055 | 10.6 | 3.6 |
| PSCF2 | 1155 | 0.003 | 16.0 | 0.053 | 9.7 | |
| DT8 | 1407 | 0.003 | 16.0 | 0.053 | 9.7 | 2.5 |
| DT9 | 1511 | 0.004 | 16.0 | 0.053 | 9.7 | 3.0 |
| DT10 | 1508 | 0.004 | 18.7 | 0.061 | 9.5 | 2.0 |
| PSCF3 | 1198 | 0.003 | 18.3 | 0.056 | 11.4 | |
| DT11 | 1502 | 0.004 | 18.3 | 0.056 | 11.4 | 3.2 |
| DT12 | 1492 | 0.004 | 18.2 | 0.059 | 10.5 | 1.6 |
| DT13 | 1527 | 0.005 | 18.7 | 0.062 | 9.5 | 2.0 |
| DT14 | 1500 | 0.007 | 21.4 | 0.064 | 12.2 | 1.0 |
| DT15 | 1260 | 0.007 | 16.7 | 0.058 | 9.6 | 0.9 |
| DT16 | 1490 | 0.01 | 17.1 | 0.055 | 10.9 | 1.0 |

The two fibers according to the invention DT1 and DT2 with a central core of silica have an outer radius of depressed inner cladding which is smaller by at least 6.7 µm when compared to that of a PSCF1 fiber having the same profile but without the depressed trench.

When the fibers according to the invention DT1 and DT2 are compared, it is seen that increasing the area of the trench (second portion of the depressed inner cladding) from 2.9 µm² to 3.3 µm² makes it possible to reduce leakage losses by 0.001 dB/km while conserving a cable cut-off wavelength $\lambda_{cc}$ of less than 1530 nm.

The fibers DT5, DT6, and DT7 show that increasing the area of the trench to 3.6 µm² and beyond makes it possible to further reduce the leakage losses and the radius of the depressed inner cladding. However, the cable cut-off wavelength $\lambda_{cc}$ becomes greater than 1530 nm.

The fibers DT8 and DT9 with a silica central core are two further examples of fibers according to the invention. When compared to a PSCF2 fiber having the same profile but without a depressed trench, fiber DT8 has an outer radius of depressed inner cladding which is smaller by a least 5.9 µm, and fiber DT9 has an outer radius of depressed inner cladding smaller by at least 7.9 µm.

The fiber DT11 with a silica central core is another example of a fiber according to the invention. Compared to a PSCF3 fiber having the same profile but no depressed trench, the fiber DT11 has a radius of the depressed inner cladding smaller by at least 8.5 µm.

The examples of fiber with a silica central core DT3, DT4 and DT10 illustrate an embodiment in which a supplementary third portion of depressed inner cladding is added between the second portion, i.e. the depressed trench, and the outer optical cladding in silica. The fibers DT3, DT4 and DT10 have a depressed inner cladding radius less than 34 µm, a leakage loss less than 0.005 dB/km and cable cut-off wavelength less than 1530 nm.

The examples DT12 and DT13 illustrate a further embodiment in which the central core is lightly doped with germanium. Typically, the germanium doping is from 1 to 3 wt %. The fibers DT12 and DT13 have a depressed inner cladding radius less than 33 µm, leakage losses less than 0.005 dB/km at 1550 nm, and cable cut-off wavelengths less than 1530 nm. Fibers having profiles which are respectively identical to those of the fibers DT12 and DT13 but without a depressed trench (not given in the tables) have leakage losses greater than 0.1 dB/km at 1550 nm, which becomes prohibitive in terms of overall attenuation for an optical fiber.

Example DT14 also illustrates the embodiment of FIG. 2, in other words comprising a supplementary third portion of depressed inner cladding added between the second portion, i.e. the depressed trench, and the outer optical cladding of silica. The fiber has a central core of 6.01 µm diameter, leading to a mode diameter of 12.2 µm, more than 1 µm greater than the preceding examples of the same embodiment.

Example DT15 illustrates the same embodiment as that of example DT14 but with a trench closer to the central core, leading to a cable cut-off wavelength of 1260 nm, about 200 nm less than that in the preceding examples of this embodiment.

Example DT16 illustrates the first embodiment, in which the first depressed inner cladding portion comprises supplementary portions with different refractive indices.

In the examples of fiber of the invention given above, the radius of the depressed inner cladding is less than the radius of the depressed inner cladding of a prior art fiber. In effect, prior art fibers have a depressed inner cladding radius which is typically greater than 40 µm, whereas in the case of the fibers according to the invention, the depressed inner cladding has a radius of less than 40 µm, or yet even less than 38 µm, and even less than 36 µm. Consequently, manufacturing costs of a fiber according to the invention are reduced compared to those for a fiber of the prior art. The reduction in depressed inner cladding radius is obtained thanks to the characteristics of the depressed trench discussed previously, while keeping leakage losses below 0.01 dB/km and cable cut-off wavelength less than 1530 nm.

The characteristics of the fiber can make it possible also to obtain a reduction in depressed inner cladding radius without modification to the chromatic dispersion, the dispersion slope and the mode diameter.

The invention also provides an optical system that includes at least one portion of fiber according to the invention.

The invention claimed is:
1. An optical fiber comprising:
an optical core surrounded by an outer optical cladding, said optical core comprising from its center to its periph- ery a central core and a depressed inner cladding, said central core having a radius $r_1$, and a refractive index difference $\Delta n_1$ with respect to the outer optical cladding, and said depressed inner cladding comprising at least a first and a second portion;

wherein said first portion is adjacent to the central core and has a radius $r_2$, and a refractive index difference $\Delta n_2$ with respect to the outer optical cladding that is negative;

wherein said second portion is adjacent to the first portion having a radius $r_3$, and a refractive index difference $\Delta n_2$ with respect to the outer optical cladding that is negative;

wherein the refractive index difference $\Delta n_3$ is more negative than the refractive index difference $\Delta n_2$;

wherein the outer radius of the depressed inner cladding is between 28 and 40 µm;

wherein the LP01 mode leakage losses at a wavelength of 1550 nm are less than 0.01 dB/km; and wherein the cable cut-off wavelength is less than 1530 nm.

2. The fiber according to claim 1 wherein the outer radius of the depressed inner cladding is less than 36 µm.

3. The fiber according to claim 1 wherein the total attenuation at a wavelength of 1550 nm is less than 0.19 dB/km, preferably less than 0.18 dB/km.

4. The fiber according to claim 1 wherein the area of the second portion of the depressed inner cladding is defined by $(\Delta n_2 - \Delta n_3)*(r_3^2 - r_2^2)$, is comprised between 0.8 and 3.6 µm².

5. The fiber according to claim 1 wherein the ratio $r_2/r_1$ is greater than 6.

6. The fiber according to claim 1 wherein the depressed inner cladding comprises a third portion located between the second portion and the outer optical cladding, said third portion having a radius $r_4$ and a refractive index difference $\Delta n_4$ with the outer optical cladding, wherein the refractive index difference $\Delta n_4$ is less negative than the refractive index difference $\Delta n_3$ of the second portion.

7. The fiber according to claim 6 wherein the ratio $r_2/r_1$ is comprised between 1.5 and 3.5.

8. The fiber according to claim 1 wherein the radius $r_1$ of the central core is comprised between 3.8 and 7 µm.

9. The fiber according to claim 1 wherein the refractive index difference $\Delta n_1 - \Delta n_2$ between the central core and the first portion of the depressed inner cladding is comprised between $3.9 \times 10^{-3}$ and $6.2 \times 10^{-3}$.

10. The fiber according to claim 1 wherein the refractive index difference $\Delta n_3$ between the second portion of the depressed inner cladding and the outer optical cladding is comprised between $-16 \times 10^{-3}$ and $-7 \times 10^{-3}$.

11. The fiber according to claim 1 wherein the refractive index difference $\Delta n_2$ between the first portion of the depressed inner cladding and the outer optical cladding is comprised between $-7 \times 10^{-3}$ and $-2 \times 10^{-3}$.

12. The fiber according to claim 1 wherein the depressed inner cladding comprises at least one additional portion located between the central core and the first portion of the depressed inner cladding, said at least one additional portion having a refractive index difference with the outer optical cladding that lies between $\Delta_1$ and $\Delta n_3$.

13. The fiber according to claim 1 wherein the mode field diameter (MFD) at a wavelength of 1550 nm is comprised between 9.5 µm and 14 µm.

14. The fiber according to claim 1 wherein the chromatic dispersion at a wavelength of 1550 nm is comprised between 14 and 24 ps/nm·km, preferably less than 22 ps/nm·km, more preferably less than 20 ps/nm·km.

15. The fiber according to claim 1 wherein the slope of the chromatic dispersion at a wavelength of 1550 nm is comprised between 0 ps/nm²·km and 0.070 ps/nm²·km.

16. The fiber according to claim 1 wherein the central core is made of pure silica or germanium doped silica with a concentration of germanium less than 3 wt %.

17. An optical transmission system comprising at least one portion of optical fiber according to claim 1.

* * * * *

UNITED STATES PATENT AND TRADEMARK OFFICE
CERTIFICATE OF CORRECTION

PATENT NO. : 8,488,931 B2  
APPLICATION NO. : 12/902190  
DATED : July 16, 2013  
INVENTOR(S) : Marianne Bigot-Astruc et al.

Page 1 of 1

It is certified that error appears in the above-identified patent and that said Letters Patent is hereby corrected as shown below:

In the Claims:

Column 11, line 10, delete "$\Delta n_2$" and enter --$\Delta n_3$-- after the words "refractive index difference".

Signed and Sealed this
Third Day of September, 2013

Teresa Stanek Rea
*Acting Director of the United States Patent and Trademark Office*